United States Patent [19]
Haibach

[11] 3,746,537
[45] July 17, 1973

[54] PROCESS AND APPARATUS FOR THE CONTROL OF THE SPEED OF MOVEMENT OF SINTER STRAND

[75] Inventor: Heinz Eugen Haibach, Eltville, Germany

[73] Assignee: Dravo Corporation, Pittsburgh, Pa.

[22] Filed: Aug. 27, 1971

[21] Appl. No.: 175,597

[52] U.S. Cl. .................. 75/200, 266/21, 73/341, 432/17, 432/45
[51] Int. Cl. ............................................. F27b 21/02
[58] Field of Search ................. 263/28; 266/21; 73/341; 74/360

[56] References Cited
UNITED STATES PATENTS

| | | | |
|---|---|---|---|
| 3,265,377 | 8/1966 | Cappel | 266/21 |
| 2,878,003 | 3/1959 | Dykeman et al. | 266/21 |
| 3,194,546 | 7/1965 | Schuerger et al. | 263/28 |

Primary Examiner—John J. Camby
Assistant Examiner—Henry C. Yuen
Attorney—Parmelee, Utzler & Welsh

[57] ABSTRACT

A process and apparatus for regulating the speed of movement of a sinter strand, upon which sinterable material is disposed, with the speed of movement of the sinter strand being controlled so that the burn-through point of the sinter mixture is accurately determined along the length of the sinter strand. The gas permeability of the sinter mixture is measured at at least two points along the sinter strand and used to generate signals which are a function of the gas permeability, which signals are compared to produce a control signal for controlling the speed of the sinter strand, whereby the position of the burn-through is controlled.

12 Claims, 2 Drawing Figures

FIG. I.

PROCESS AND APPARATUS FOR THE CONTROL OF THE SPEED OF MOVEMENT OF SINTER STRAND

BACKGROUND OF THE INVENTION

This invention concerns a process and apparatus for the regulation of the speed of movement of a sinter strand, to accurately determine the position of the burn-through point of the sinter mixture, by determining the gas permeability of the sinter mixture at points along the sinter strand.

The speed of movement of the sinter strand is controlled to determine the position of the burn-through point of the sinter mixture, with the speed of movement of the sinter strand being so regulated that the burn-through point occurs at predetermined position along the length of the sinter strand. In most cases, the burn-through point should lie just before the emergence end of the sinter strand from the sintering, heating zone, since in this way the sinter strand is completely utilized for the sintering process. If the sinter zone is connected with a cooling zone on the sinter strand, the burn-through point must be determined to be at a position on the sinter strand so that a definite cooling distance can be maintained.

It is known to determine the position of the burn-through point by determining the position of the maximum temperature of the exhaust gas at the burn-through point (U.S. Pat. No. 2,878,003), and it is also known to do this by analyzing the exhaust gas (German Published application No. 1,169,471). These measurements at the burn-through have also been combined with measurements of the exhaust gas temperature and an analysis of the exhaust gas at the middle point of the sinter strand in order to improve the regulation of sinter strand speed. (German Published application Nos. 1,147,959; 1,169,471). These measurements require the arrangement of measuring points below the sinter strand, and the prevention of introduction of error-inducing air at the measuring points.

It is also known to measure the momentary air permeability of the sinter mixture in a zone of the sinter strand where the air permeability is constant. This zone lies about in the middle of the moving distance of the sinter strand. The speed of the sinter strand can then be regulated independently of the air permeability measured (German Patent No. 1,188,814).

It is well known that with constant sinter mixture and layer height and constant suction, that the speed of the air passed through the middle line (axis) of the sinter strand remains constant over the entire length of the burning zone, and only rises beyond the burn-through point, that is when a cooling zone is connected. Since the amount of air necessary to sinter a ton of a given sintering material is also constant, it is possible to calculate the burn-through point position from a measurement of the air speed of the necessary amount of air. The air speed can be measured shortly after the ignition of the mixture (German Pat. No. 1,153,531). An exact determination of the position of the burn-through point is not possible through this process.

The present invention solves the problem of measuring the exact position of the burn-through point, without the attendant disadvantages which are present in measuring the exhaust gas temperature and exhaust gas composition.

In the present invention, the position of the burn-through point is determined by the change in gas permeability of the sinter mixture that occurs at the burn-through point, and this is achieved by arranging gas permeability measuring devices above the sinter mixture.

The measurement of gas permeability according to the present invention may also take place by feeding air at constant pressure with the gas permeability measuring device over a constant area, and measuring the corresponding amount of air passed through the sinter bed.

It is also possible to measure the gas permeability by means of the reflection of gamma rays.

In the preferred design of the present invention, the gas permeability measuring device is movably mounted so that it can be moved back and forth along the length of the sinter strand. In this way it is possible to determine the position of the burn-through point even if there is a great variation, and also during the start-up operation of the sinter strand.

Another preferred design of the invention consists of arranging numerous gas permeability measuring devices one after the other in the moving direction of the sinter strand, but the apparatus expense is increased.

In one embodiment of the present invention, three gas permeability sensing and measuring devices are successively positioned above the bed of sinter material proximate the end of the sinter strand. Electrical signals are generated by the sensing devices which are indicative of the gas permeability of the sinter bed below the respective sensor. The electrical signals generated are compared in a simple network to provide a differential error signal. The relationship of the signals $M_1$, $M_2$, and $M_3$ produced by the respective sensors will follow the general relationship $2 M_1 = M_2 + M_3$. When burn-through occurs, the gas permeability of the sinter bed increases dramatically, so that the signal produced by the sensor following the burn-through will be significantly higher than the other signals. The resultant differential signal had from the summation circuit can then be used as a control signal for varying the speed of the material advance to insure that burn-through occurs at the desired position along the travel of the sinter strand. The present arrangement has the advantage that relative gas permeability is being measured.

When using only two such gas permeability sensing and measuring devices, the normal relationship for signals is $M_1 = M_2$, so that if burn-through occurs between the position of sensors the signal $M_2$ will be much greater than $M_1$, and give rise to the differential control signal.

The process of the present invention may be combined with one of the other known measuring processes such as gas temperature measurement which undertake a measurement at a point toward the free end of the sinter strand. The measured value from the known processes can then serve for the coarse regulation of the sinter strand moving speed, with the process of the present invention used to determine the burn-through point accurately for fine adjustment of the sinter strand speed.

The process of the present invention is illustrated by way of example for use with three such air permeability measuring devices in the description below.

DESCRIPTION OF THE PREFERRED EMBODIMENT

Figure 1:
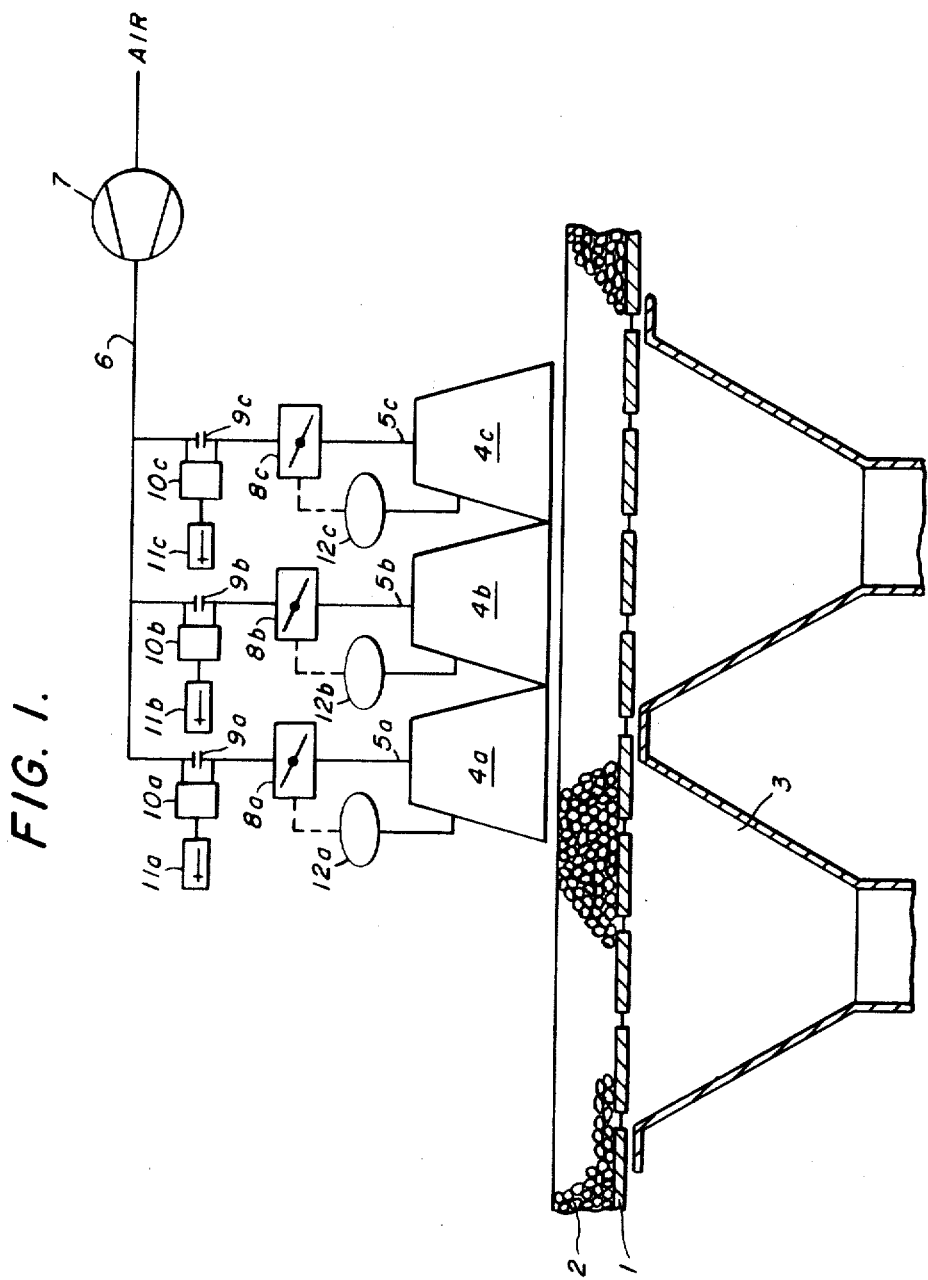
FIG. 1 is a representation of a sinter strand according to the present invention showing only two of the suction boxes of the sinter machine, and with a schematic representation of the air permeability measuring apparatus disposed thereabove.
Figure 2:
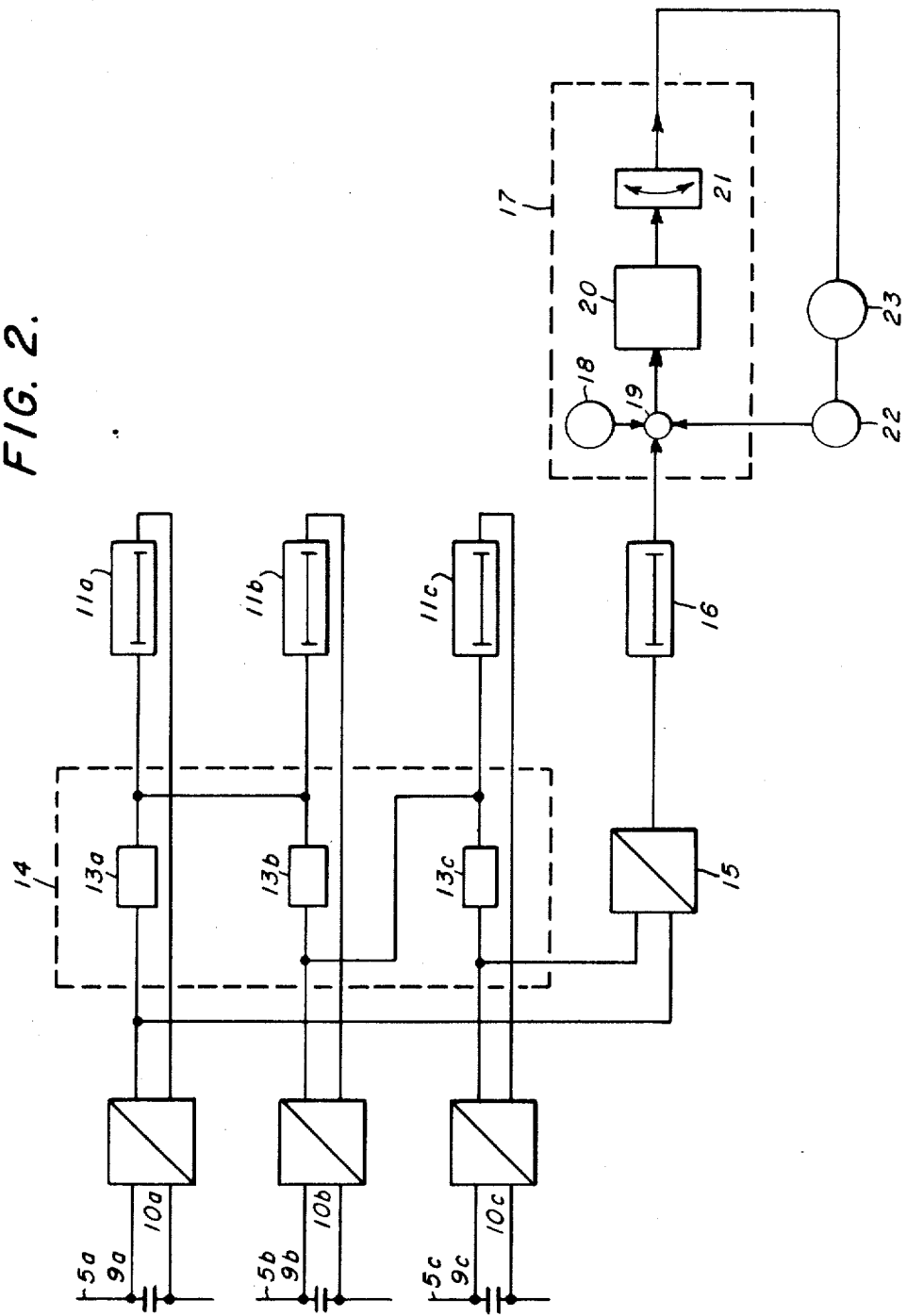
FIG. 2 is a schematic diagram for the control system of the present invention.

A gas-permeable grate 1 of the sinter strand is shown with a layer of sinterable material 2 disposed thereon. Air is passed through the material 2 with the aid of the suction boxes 3. Three hoods 4a, 4b, and 4c are arranged above the layer of sinterable material 2. Each hood is respectively connected through lines 5a, 5b, and 5c to collection line 6 into the blower 7. Respective choke valves 8a, 8b, and 8c are positioned in each of the lines 5a, 5b, and 5c. In the same line with choke valves 8a through 8c, are differential-pressure sensors 9a, 9b, and 9c, each with an associated amount-indicators 11a, 11b, 11c. A pressure regulating circuit 12a, 12b, and 12c is respectively connected to each of the hoods, and is used to control respective choke valves 8a, 8b, and 8c. The predetermined pressure in respective hoods is held constant by these regulating circuits 12a, 12b, and 12c. The gas permeability of the layer of sinterable material 2 under a particular hood determines the amount of air penetrating into the lines 5a through 5c. The differential pressure sensed at the differential-pressure-sensors 9a through 9c is fed to the amount-measurement transformers 10a through 10c. The measurement transformers convert differential pressure into an output signal, $M_1$ through $M_3$, which are proportional to the air flow through the sinter bed below the respective sensors. The output signals are generated as direct current signals and passed through respective resistances 13a through 13c, and to the respective indicators 11a through 11c. The summation circuit 14 is used to compare the generated signals and to provide a differential output signal. The output signal from the summation circuit 14 is applied to a voltage measurement transformer 15, the output of which corresponds to a similarly impressed direct current signal. The output of the voltage measurement transformer is applied to the indicator 16 to indicate the differential output on a meter and the signal is used as a control signal by applying it to the control system 17. The control system 17 comprises a reference signal generator 18 which supplies a signal which is a function of, or corresponds to the position of the burn-through point at a given position along the sinter machine, the summation point 19, the regulating amplifier 20, and the operating apparatus 21. A comparison is made at summation point 19 between the predetermined reference value signal had from 18 which provides a signal corresponding to the desired position of the burn-through point, with the actual measured values of the burn-through point, which is had from the differential voltage of the differential voltage measurement transformer 15. For stabilization, an additional voltage is applied at the summation point from a tachometer generator 22. This tachometer generator 22 is coupled with the drive 23 of the sinter strand. The resultant signal had from the summation point 19 is amplified in the regulating amplifier 20, and applied to the operating apparatus 21, and to the drive means 23 of the sinter strand.

An advantage of the present invention consists in that unlike a determination of the position of the burn-through point by temperature measurement or analysis of the exhaust gas, no disturbing influences through error-inducing air can occur. Moreover, no measuring devices are needed below the sinter strand in the suction boxes. An exact determination of the burn-through point is thus possible.

Thermocouple measurements could be used to indicate if burn-through occurs prior to the first sensor. The indicating meters 11a–11c would also provide this information.

It can be readily appreciated that a single gas permeability sensing and measuring device can be employed, with the device movably mounted above the sinter bed and movable along the bed. The movable device would be used to generate signals at various positions along the sinter bed, and these signals would be compared using a network similar to that already described to produce a differential control signal used to vary the speed of movement of the sinter strand. In using a movable sensing means, it is preferred that the sensing means be moved at a speed significantly greater than the speed of travel of the sinter strand in order to minimize or substantially negate the time dependence of the derived signals. This will provide a greater accuracy for the determination of the burn-through point.

I claim:

1. In a sintering process, or the like, wherein material is advanced in a gas permeable bed through successive heating zones for a predetermined heat treatment by the passage of gases through the bed and wherein the heat treatment is determinable by changes in the gas permeability of the bed of material, the method of controlling the heat treatment comprising:

a. sensing the gas permeability of the bed of material over a pluraltiy of zones including at least the desired end point zone and another zone in advance of the end point zone and generating signals indicative of the gas permeability of the material at each sensing zone thereof;

b. comparing signals derived from the end point zone with signals derived from the advance zone and deriving a control signal therefrom indicative of any change in gas permeability between the zones; and c. controlling the speed of advance of the material in accordance with the control signal.

2. The process specified in claim 1, wherein the sensing of the gas permeability is effected at a pluraltiy of positions proximate the end of the heating zones to determine the position of burn-through proximate the end of the heating zones.

3. The process specified in claim 1, wherein the heating air is maintained at a constant pressure above the bed of material in the sensing zones.

4. The process specified in claim 2, wherein three sensing zones are employed.

5. The process specified in claim 2, wherein sensor means which are movable along the travel of the bed are used.

6. The process defined in claim 1 wherein the sensing step includes moving a sensing means to and fro between the sensing zones at a speed significantly greater than the speed of travel of the sinter strand in order to minimize or substantially negate the time dependence of the derived signals.

7. The process specified in claim 1, wherein the control signal is compared to a reference signal which is indicative of a predetermined position of burn-through to derive a resultant signal for controlling the speed of advance of the material.

8. Apparatus for accurately determining the position of burn-through for sinterable material which is disposed on a gas permeable bed and advanced by drive means through a heating zone for a predetermined heat treatment by the passage of gases through the bed, and wherein the heat treatment is determinable by changes in the gas permeability of the bed of material, comprising:
   a. sensing means disposed above the bed of material for sensing the gas permeability of the bed of material at at least two positions along the bed travel, and generating an electrical signal which is a function of the gas permeability;
   b. signal comparing means for comparing the signals generated by the sensing means and generating a control signal therefrom indicative of a predetermined differential between the signals;
   c. means for applying the control signal to the drive means of the sinter bed to thereby control the speed of advance of the material in accordance with the control signal so that the position of burn-through occurs at a determinable point.

9. The apparatus specified in claim 8, wherein three sensing means are preferably employed proximate the end of the heating zone.

10. The apparatus specified in claim 8, wherein sensing means are movably mounted above the bed, and the sensing means travels along the bed.

11. The apparatus specified in claim 10, wherein the sensing means is movable at a speed significantly greater than the speed of travel of the sinter strand in order to minimize, or substantially negate, the time dependence of the generated control signal.

12. The apparatus specified in claim 8, wherein the signal comparing means conprises means for comparing the control signal to a reference signal which is indicative of a predetermined position of burn-through, with the resultant signal applied to the drive means.

* * * * *